(12) United States Patent
Honsinger

(10) Patent No.: US 6,711,303 B1
(45) Date of Patent: *Mar. 23, 2004

(54) METHOD AND COMPUTER PROGRAM FOR DETECTING ROTATION AND MAGNIFICATION OF IMAGES

(75) Inventor: Chris W. Honsinger, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/452,415

(22) Filed: Dec. 1, 1999

(51) Int. Cl.[7] .............................. G06K 9/36; G06K 9/56; G06T 7/00
(52) U.S. Cl. ...................... 382/289; 382/286; 382/278; 382/296; 382/298; 382/100; 382/205; 358/3.28
(58) Field of Search .................... 382/276, 286, 382/289, 278, 297, 298, 264, 205; 358/3.28; G06K 9/64

(56) References Cited

U.S. PATENT DOCUMENTS

| | | | | |
|---|---|---|---|---|
| 3,749,919 A | * | 7/1973 | Kegelman | 250/214 LA |
| 4,084,255 A | * | 4/1978 | Casasent et al. | 359/107 |
| 4,571,635 A | * | 2/1986 | Mahmoodi et al. | 250/581 |
| 5,185,815 A | * | 2/1993 | Brandstetter | 359/29 |
| 5,533,149 A | * | 7/1996 | Kaplan et al. | 382/260 |
| 5,734,801 A | * | 3/1998 | Noguchi et al. | 358/1.9 |
| 5,822,458 A | * | 10/1998 | Silverstein et al. | 382/233 |
| 5,835,639 A | | 11/1998 | Honsinger et al. | |
| 5,852,678 A | * | 12/1998 | Shiau et al. | 382/176 |
| 5,887,084 A | * | 3/1999 | Wober et al. | 382/240 |
| 5,982,915 A | * | 11/1999 | Doi et al. | 382/130 |
| 6,014,471 A | * | 1/2000 | Barkan et al. | 358/447 |
| 6,091,243 A | * | 7/2000 | Xiang et al. | 324/307 |
| 6,219,462 B1 | * | 4/2001 | Anandan et al. | 382/294 |
| 6,341,180 B1 | * | 1/2002 | Pettersson et al. | 382/255 |
| 6,385,329 B1 | * | 5/2002 | Sharma et al. | 382/100 |

FOREIGN PATENT DOCUMENTS

| | | | | |
|---|---|---|---|---|
| WO | WO 9910832 A1 | * | 3/1999 | G06K/9/00 |
| WO | WO 99/12347 | | 3/1999 | H04N/5/913 |

OTHER PUBLICATIONS

Geert Depovere et al., Improved Watermark Detection Reliability Using Filtering Before Correlation, 1998 IEEE, pp. 430–434.

Hsin–Chih Lin et al., Extracting Periodicity of a Regular Texture Based on Autocorrelation Functions, Pattern Recognition Letter 18 (1997) pp. 433–443.

* cited by examiner

Primary Examiner—Jingge Wu
Assistant Examiner—Ryan J. Hesseltine
(74) Attorney, Agent, or Firm—Peyton C. Watkins

(57) ABSTRACT

An improved method and computer program product for detecting an amount of rotation or magnification in a modified image, of the type including the steps of: a) embedding a marker image having a pair of identical features separated by a distance d and oriented at an angle α in an original image to produce a marked image, the marked image having been rotated and/or magnified to produce the modified image; b) performing an autocorrelation on the modified image to produce a pair of autocorrelation peaks corresponding to the location of the features of the marker image in the modified image; and c) comparing the separation d and orientation α of the autocorrelation peaks with the separation d and orientation α of the features in the marker image to determine the amount of rotation and magnification in the modified image, wherein the improvement comprises the step of: d) preprocessing the modified image to have a constant standard deviation over all local regions in the image.

6 Claims, 5 Drawing Sheets

METHOD AND COMPUTER PROGRAM FOR DETECTING ROTATION AND MAGNIFICATION OF IMAGES

FIELD OF THE INVENTION

The invention relates generally to the field of image processing, and in particular to methods for detecting when an image has been rotated or resized (magnified).

BACKGROUND OF THE INVENTION

U.S. Pat. No. 5,835,639 issued Nov. 10, 1998 to Honsinger et al., entitled "Method For Detecting Rotation And Magnification In Images" describes a method for embedding two identical carriers in an image in order to track rotation and magnification changes. The method is based on the fact that the autocorrelation of the image will contain the cross-correlation of the two carriers and the cross-correlation will exhibit two delta functions whose distance apart will be proportional to magnification and whose angle will be maintained under no rotation or will be rotated in the same amount as the rotation of the original image. Thus, by identifying the location (separation and rotation) of the two delta functions one can determine the amount of rotation and magnification that an image has undergone. In images that contain a large amount of pronounced linear and angular features, these features tend to cause the autocorrelation of the image to exhibit a number of features that mask the delta functions, thereby making the detection of the delta functions difficult.

There is a need therefore for an improved method of detecting angular rotation and magnification of the type disclosed in the above referenced patent that avoids this problem.

SUMMARY OF THE INVENTION

The present invention is directed to overcoming one or more of the problems set forth above. Briefly summarized, according to one aspect of the present invention an improved method and computer program product for detecting an amount of rotation or magnification in a modified image, of the type including the steps of:

a) embedding a marker image having a pair of identical features separated by a distance d and oriented at an angle α in an original image to produce a marked image, the marked image having been rotated and/or magnified to produce the modified image;

b) performing an autocorrelation on the modified image to produce a pair of autocorrelation peaks corresponding to the location of the features of the marker image in the modified image; and c) comparing the separation d and orientation α of the autocorrelation peaks with the separation d and orientation α of the features in the marker image to determine the amount of rotation and magnification in the modified image, wherein the improvement comprises the step of:

d) preprocessing the modified image to have a constant standard deviation over all local regions in the image.

The present invention has the advantage of being able to more easily detect the autocorrelation peaks in an image having large amounts of linear and angular detail.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
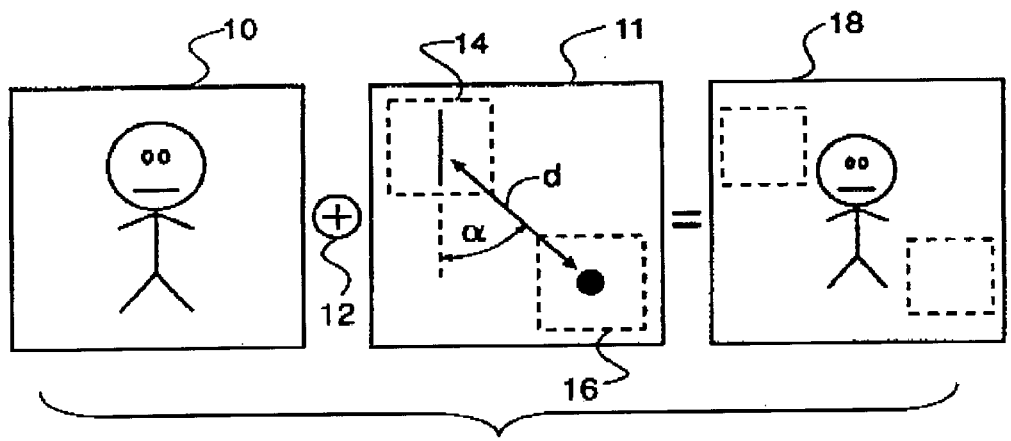
FIG. 1 is a schematic diagram showing the prior art method of adding of a marker image to an original image.
Figure 2:
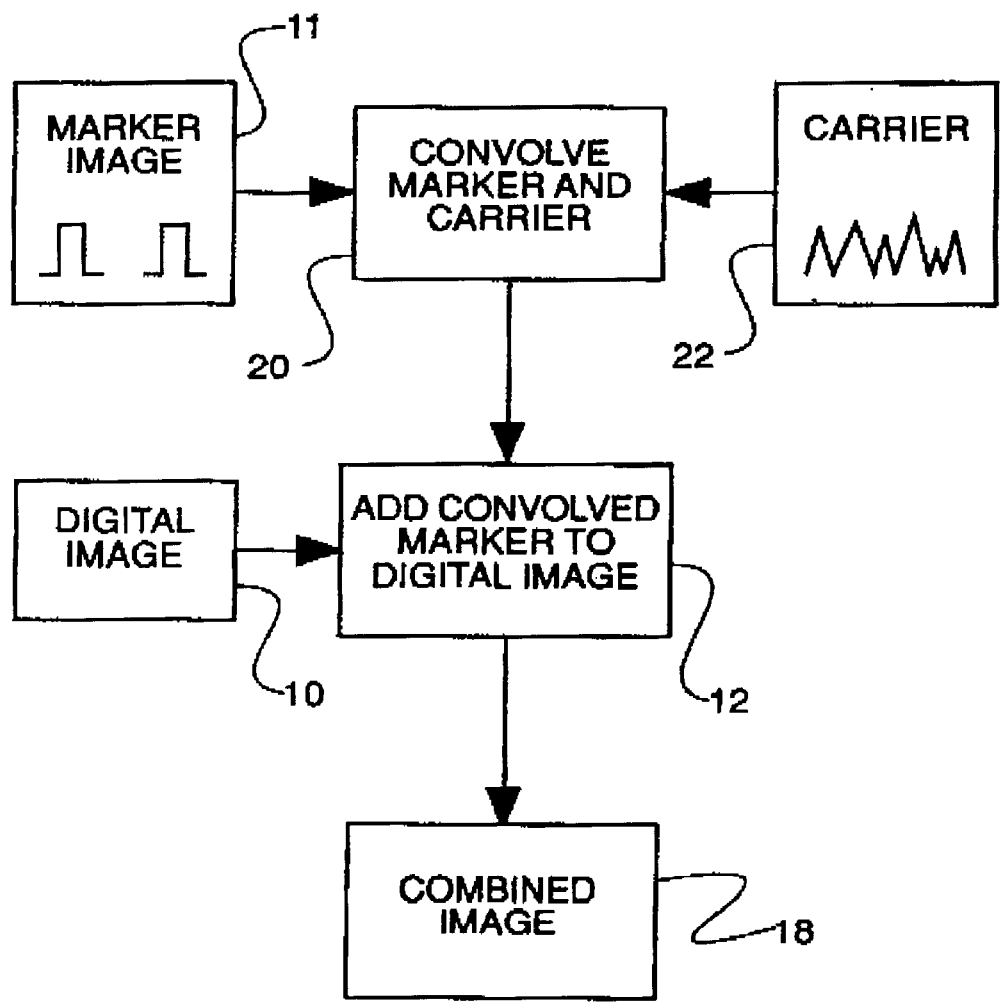
FIG. 2 is a flow chart illustrating one prior art method of generating a marker image.

Referring to FIGS. 1 and 2, a digital image 10 is prepared by adding 12 a marker image 11 having a pair of identical features 14 and 16 to produce a combined image 18. The identical features 14 and 16 in the marker image 11 are oriented a distance "d" from each other and at an angle "α" with respect to the vertical in image 10. Referring to FIG. 2, prior to adding the marker image 11 to the image 10, the features 14 and 16 in the marker image 11 are convolved 20 with a carrier image 22 and magnified (or minified) such that their amplitude is low relative to the amplitude of the original image so that the marker image is not visible in the combined image 18. In one example, the marker image features 14 and 16 are delta functions (one pixel at maximum amplitude) convolved with a random carrier signal 22 having a uniform frequency amplitude and random phase. In an alternative example, the marker image may contain information such as digital code (such as 0's and 1's ordered in such a way as to effect a message) or text image such as a copyright notice.

Figure 3:
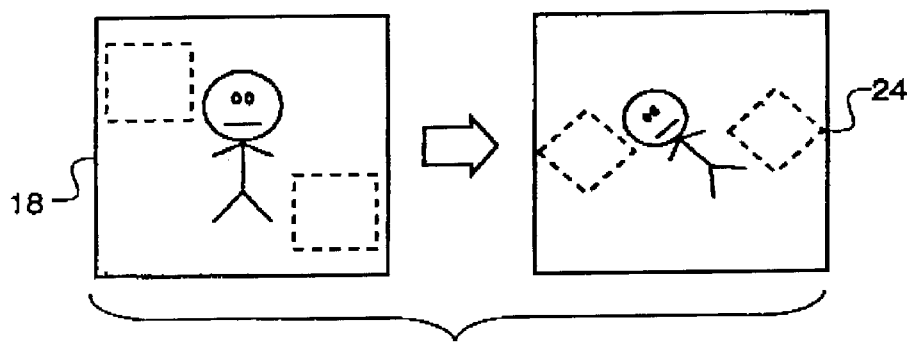
FIG. 3 is a schematic diagram showing a prior art rotation and magnification of the marked image to produce a modified image.

The identical digital code or text images are convolved with the carrier signal 22 as described above and then added to the image 10. Referring to FIG. 3, the angular orientation and/or magnification of the combined image 18 is changed, for example in an optical or digital printing or copy process to produce a modified combined image 24.

Figure 4:
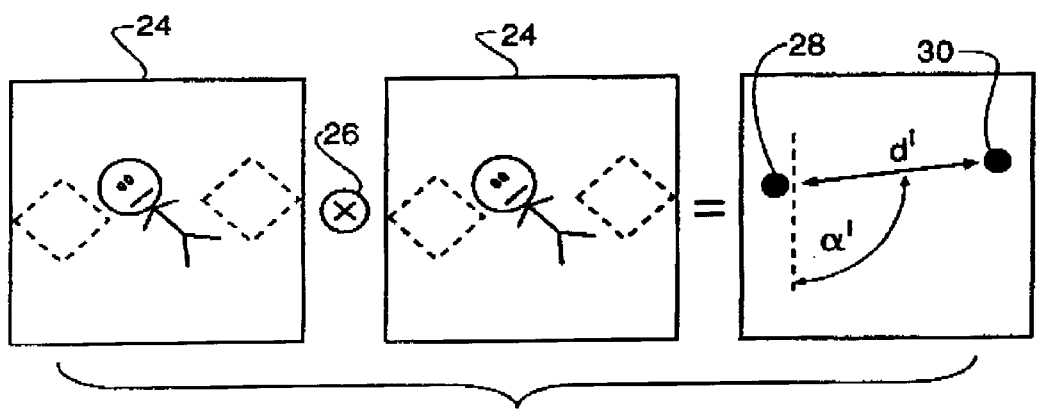
FIG. 4 is a schematic diagram illustrating the prior art method of recovery of the separation and orientation of the features in a marker image in the modified image.
Figure 5:
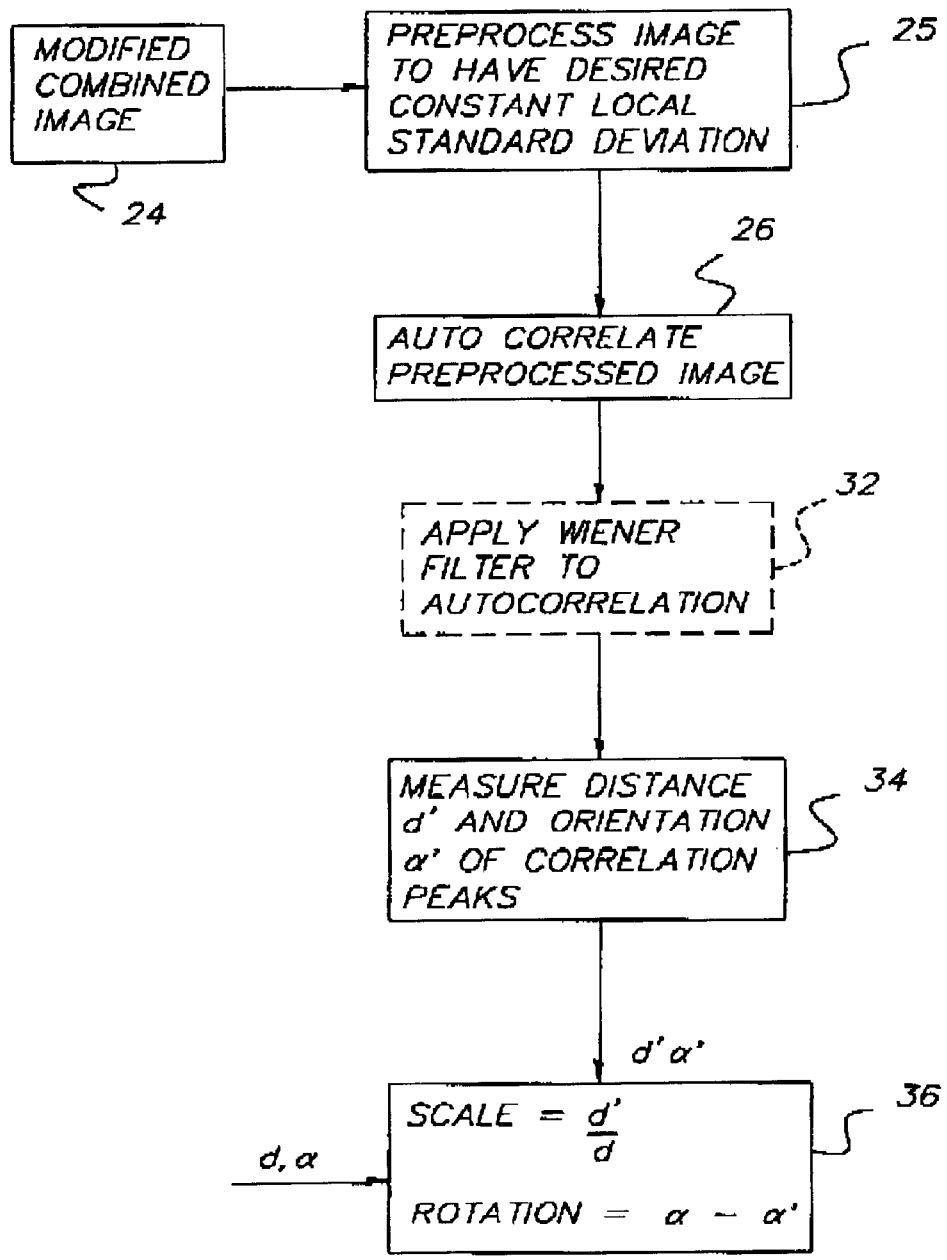
FIG. 5 is a flow chart showing the determination of the rotation and magnification of the modified image and the recovery of the original image size and orientation according to the present invention.
Figure 6:
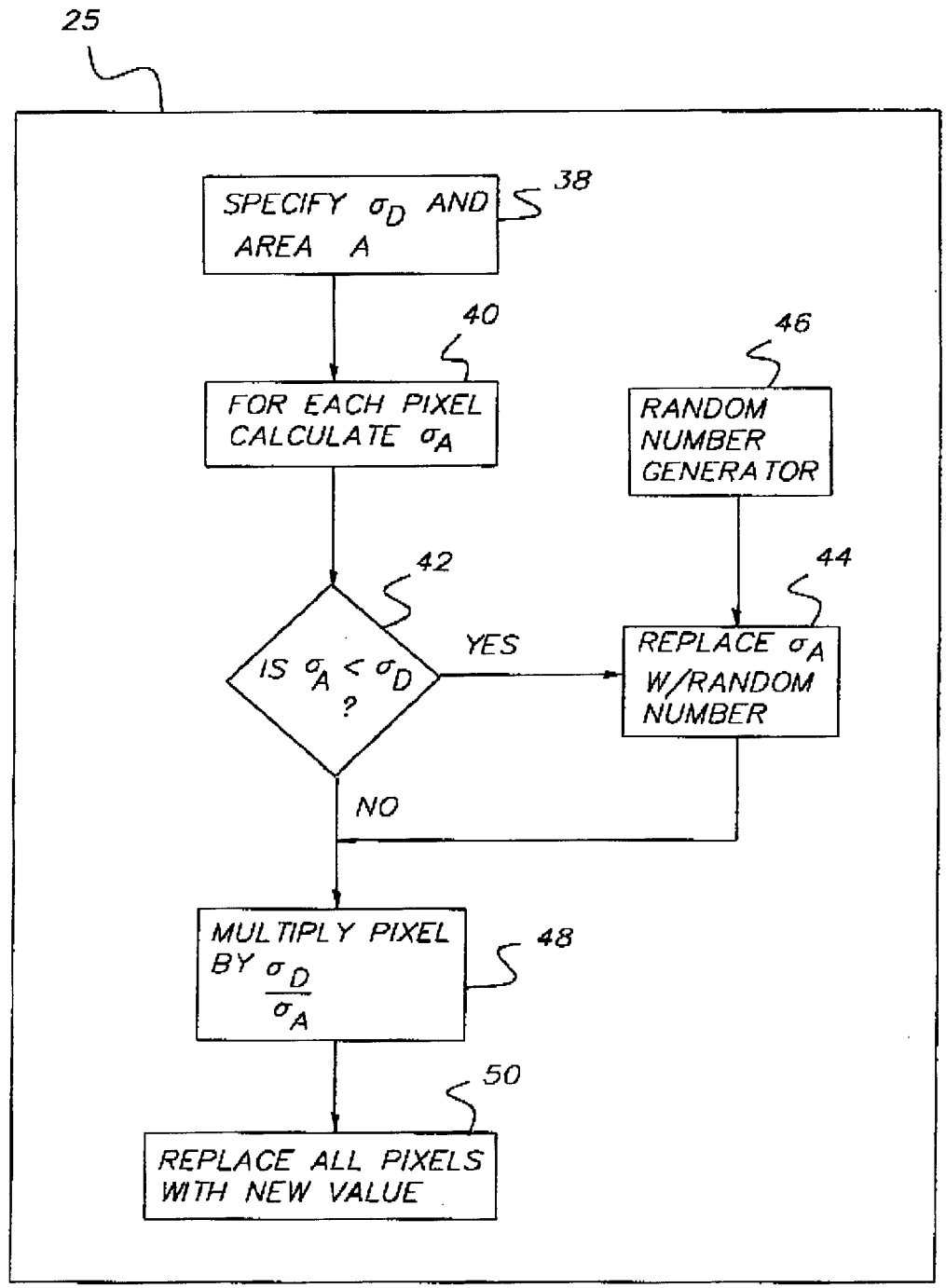
FIG. 6 is a flow chart showing the steps employed in preprocessing the image according to the present invention.

Referring to FIGS. 4 and 5, to determine if and how much the modified combined image 24 has been rotated and magnified, the modified combined image 24 is first preprocessed 25 to have a desired constant local standard deviation. Referring to FIG. 6, this may be achieved by specifying a desired standard deviation $\sigma_D$ that is chosen to be relatively low, but not too low (preferably 0.1 to 0.3) and a surrounding area A (preferably over 3×3 to 5×5 pixel regions) for the normalization to be performed 38. For each pixel within the modified image, a local standard deviation $\sigma_A$ is calculated 40. The local standard deviation is tested 42 and if the calculated standard deviation is less than the desired standard deviation $\sigma_D$, it is replaced 44 with a random number generated from a process 46 having the same standard deviation as the desired standard deviation. The pixel value is then multiplied 48 by the ratio of the desired standard deviation and the local standard deviation to form a modified pixel value. Finally, all of the pixel values in the modified image are replaced 50 with the modified pixel values. The resulting image will have the desired constant local standard deviation $\sigma_D$. Since the preprocessed image has a constant local standard deviation, the effect on the autocorellation due to the high contrast of the edges and angular features of the image is substantially reduced.

Figure 7:
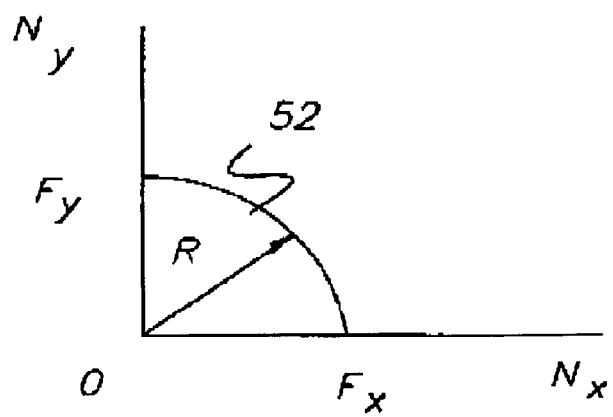
FIGS. 7 and 8 are diagrams useful in describing a preferred filter for filtering the autocorrelation according to a preferred method of practicing the present invention.
Figure 8:
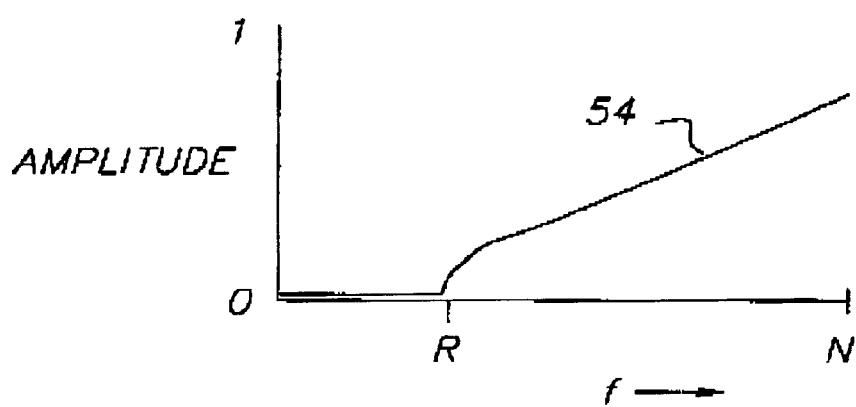

Next, the preprocessed image is autocorrelated 26. The autocorrelation will result in two autocorrelation peaks 28 and 30 corresponding to the centers of the features in the marker image 11. Preferably the autocorrelation is performed in the frequency domain using Fourier transform techniques. The autocorrelation is simply the inverse Fourier transform of the magnitude of the forward Fourier transform. The two autocorrelation peaks may, optionally, be further emphasized during the processes of autocorrelation in the frequency domain by weighting the Fourier transform coefficients by the frequency domain representation of a Wiener filter 32 that emphasizes isolated peaks and suppresses smooth regions. An example of a Wiener filter useful for this purpose is illustrated in FIGS. 7 and 8. FIG. 7 is a two dimensional frequency plot having frequency axes $f_x$ and $f_y$ from zero to the Nyquist frequency $N_x$, $N_y$. The filter has the effect of setting to zero the Fourier transform coefficients for frequencies in a region 52 having a radius R centered about zero frequency. For regions outside this radius, the weighting function is a monotonically increasing function as shown by line 54 in FIG. 8. The Wiener filter can be expressed as follows:

For $$(f_x^2+f_y^2)^{0.5} > R \quad w(f_x,f_y)=a(f_x^2+f_y^2)^\beta \quad (1)$$

and for $$(f_x^2+f_y^2)^{0.5} \leq R \quad w(f_x,f_y)=0$$

where $\alpha$ is an arbitrary constant and $\beta$ ranges from 0.50 to 1.00 in a preferred embodiment. Optionally, a linear ramp may be applied to smooth the transition region at the radius R.

The autocorrelation peak positions 28 and 30 of the modified image may be measured 34 to obtain the modified distance "d'" and the modified angle "α'" measured with respect to the vertical. If it is of interest to measure rotations greater than 180 degrees, the amplitude of the autocorrelation peaks should be measured. The modified distance "d'" and the modified angle "α'" may be used to calculate 36 the magnification and rotation that the image has undergone by use of the following formulae:

$$\text{Magnification } M=d'/d \times 100 \text{ percent.} \quad (2)$$

If the autocorrelation peak of the upper left hand corner is stronger than the lower right:

$$\text{Rotation angle } \Omega=\alpha'-\alpha \quad (3)$$

If the autocorrelation peak of the lower right hand corner is stronger than the upper left:

$$\text{Rotation angle } \Omega=\alpha'-\alpha+180 \text{ degrees} \quad (4)$$

The present invention is preferably practiced in an image processing system including a source of digital images, such as a scanner, a computer programmed to process digital images, and an output device such as a thermal or inkjet printer. The method of the present invention may be sold as a computer program product including a computer readable storage medium bearing computer code for implementing the steps of the invention. Computer readable storage medium may include, for example: magnetic storage media such as a magnetic disc (e.g. a floppy disc) or magnetic tape; optical storage media such as optical disc or optical tape; bar code; solid state electronic storage devices such as random access memory (RAM) or read only memory (ROM); or any other physical device or medium employed to store a computer program.

Appendix A contains a computer program written in the C++ language for extracting an embedded message from a digital image according to the present invention.

The invention has been described with reference to a preferred embodiment. However, it will be appreciated that variations and modifications can be effected by a person of ordinary skill in the art without departing from the scope of the invention.

PARTS LIST

10 digital image
11 marker image
12 adding step
14 identical feature
16 identical feature
18 combined image
20 convolution step
22 carrier image
24 modified combined image
25 preprocessing step
26 autocorrelation step
28 autocorrelation peak
30 autocorrelation peak
32 Wiener filter step
34 measure autocorrelation peak position step
36 calculate angle step
38 specifying step
40 calculating step
42 testing step
44 replacing step
46 random number generating process
48 multiplication step
50 replace pixels step

What is claimed:

1. An improved method for detecting an amount of rotation or magnification in a modified image, of the type including the steps of:

a) embedding a marker image having a pair of identical features separated by a distance d and oriented at an angle α in an original image to produce a marked image, the marked image having been rotated and/or magnified to produce the modified image;

b) performing an autocorrelation on the modified image to produce a pair of autocorrelation peaks corresponding to the location of the features of the marker image in the modified image; and c) comparing the separation d and orientation α of the autocorrelation peaks with the separation d and orientation α of the features in the marker image to determine the amount of rotation and magnification in the modified image, wherein the improvement comprises the step of:

d) preprocessing the modified image to have a constant standard deviation over all local regions in the image;

wherein the preprocessing step comprises the steps of:
a) specifying a desired standard deviation;
b) for each pixel within the modified image,
  i) calculating a local standard deviation, and if calculated standard deviation is less than the desired standard deviation, replacing it with a random number generated from a process having the same standard deviation as the desired standard deviation,
  ii) multiplying the pixel value by the ratio of the desired standard deviation and the local standard deviation to form a modified pixed value; and
c) replacing all of the pixel values in the modified image with modified pixel values.

2. The improved method claimed in claim 1, wherein filtering operations and the autocorrelation are performed in the frequency domain.

3. The improved method claimed in claim 1, further comprises the step of processing the autocorrelation with a Wiener filter to improve the signal to noise ratio of the autocorrelation peaks.

4. An improved computer program product, including a computer readable storage medium having a computer program stored thereon for detecting an amount of rotation or magnification in a modified image, for performing the steps of:
a) embedding a marker image having a pair of identical features separated by a distance d and oriented at an angle $\alpha$ in an original image to produce a marked image, the marked image having been rotated and/or magnified to produce the modified image;
b) performing an autocorrelation on the modified image to produce a pair of autocorrelation peaks corresponding to the location of the features of the marker image in the modified image; and
c) comparing the separation d' and orientation $\alpha'$ of the autocorrelation peaks with the separation d and orientation $\alpha$ of the features in the marker image to determine the amount of rotation and magnification in the modified image, wherein the improvement comprises the step of preprocessing the modified image to have a constant standard deviation over all local regions in the image; and wherein the preprocessing step comprises the steps of:
a) specifying a desired standard deviation;
b) for each pixel within the modified image,
  i) calculating a local standard deviation, and if calculated standard deviation is less than the desired standard deviation replacing it with a random number generated from a process having the same standard deviation as the desired standard deviation,
  ii) multiplying the pixel value by the ratio of the desired standard deviation and the local standard deviation to form a modified pixel value; and
c) replacing all of the pixel values in the modified image with modified pixel values.

5. The improved computer program product claimed in claim 4, wherein filtering operations and the autocorrelation are performed in the frequency domain.

6. The computer program product method claimed in claim 5, further comprising the step of processing the autocorrelation with a Wiener filter to improve the signal to noise ratio of the autocorrelation peaks.

* * * * *

UNITED STATES PATENT AND TRADEMARK OFFICE
CERTIFICATE OF CORRECTION

PATENT NO. : 6,711,303 B1
DATED : March 23, 2004
INVENTOR(S) : Chris W. Honsinger It is certified that error appears in the above-identified patent and that said Letters Patent is hereby corrected as shown below:

Column 1,
Line 5, please insert the following omitted paragraph:
-- The disclosure in the compact disc appendix of this patent discloure of this patent document contains material to which a claim of copyright protection is made. The copyright owner has no objection to the facsimile reproduction of any one of the patent documents or the patent disclosure, as it appears in the U.S. Patent and Trademark Office patent file or records, but reserves all other rights whatsoever. --.

Signed and Sealed this

Twenty-fifth Day of October, 2005

JON W. DUDAS
*Director of the United States Patent and Trademark Office*